United States Patent
Makwana et al.

(10) Patent No.: US 11,729,886 B2
(45) Date of Patent: Aug. 15, 2023

(54) DURATION SELECT SWITCH FOR AN EMERGENCY LIGHTING CONVERTER

(71) Applicant: TRIDONIC GMBH & CO KG, Dornbirn (AT)

(72) Inventors: Deepak Makwana, Newcastle Upon Tyne (GB); Jagjitpati Shukla, Spennymoor (GB)

(73) Assignee: Tridonic GmbH & Co KG, Dornbirn (AT)

( * ) Notice: Subject to any disclaimer, the term of this patent is extended or adjusted under 35 U.S.C. 154(b) by 66 days.

(21) Appl. No.: 17/599,001

(22) PCT Filed: Jun. 9, 2020

(86) PCT No.: PCT/EP2020/065892
§ 371 (c)(1),
(2) Date: Sep. 28, 2021

(87) PCT Pub. No.: WO2020/254140
PCT Pub. Date: Dec. 24, 2020

(65) Prior Publication Data
US 2022/0191992 A1    Jun. 16, 2022

(30) Foreign Application Priority Data

Jun. 17, 2019 (EP) .................... 19180440

(51) Int. Cl.
H05B 45/50 (2022.01)
H05B 45/37 (2020.01)
(52) U.S. Cl.
CPC ............. *H05B 45/50* (2020.01); *H05B 45/37* (2020.01)
(58) Field of Classification Search
None
See application file for complete search history.

(56) References Cited

U.S. PATENT DOCUMENTS

| 2020/0059997 A1* | 2/2020 | Dixon ................ H05B 45/385 |
| 2020/0076227 A1* | 3/2020 | Makwana ................ H02J 7/00 |

FOREIGN PATENT DOCUMENTS

| DE | 20 2016 007 323 | 3/2018 | |
| GB | 2 542 424 | 3/2017 | |
| WO | WO-2018099630 A1 * | 6/2018 | ............ H02J 7/0068 |

OTHER PUBLICATIONS

International Search Report and Written Opinion dated Jul. 10, 2020 in parent PCT Application PCT/EP/2020/065892.

* cited by examiner

*Primary Examiner* — Anh Q Tran
(74) *Attorney, Agent, or Firm* — Andrus Intellectual Property Law, LLP

(57) ABSTRACT

An emergency converter device provides an interface for selecting an operation parameter for an emergency operation mode of the emergency converter device. The emergency converter device provides a supply current $I_{LED}$ to a load device, in particular to a lighting module including on or more light emitting diodes. The emergency converter device comprises a control circuit configured to set at least one operating parameter of the emergency converter device, an interface comprising a first terminal and a second terminal for connecting electrically a status indicator light emitting diode, and a detection circuit connected to the control circuit. The detection circuit is configured to detect a polarity of the status indicator light emitting diode connected to the first terminal and the second terminal, and the control circuit selects the at least one operating parameter of the emergency converter device based on the detected polarity.

10 Claims, 5 Drawing Sheets

DURATION SELECT SWITCH FOR AN EMERGENCY LIGHTING CONVERTER

CROSS REFERENCE TO RELATED APPLICATIONS

The present application is the U.S. national stage application of international application PCT/EP2020/065892 filed Jun. 9, 2020, which international application was published on Dec. 24, 2020 as International Publication WO 2020/254140 A1. The international application claims priority to European Patent Application 19180440.0 filed Jun. 17, 2019.

FIELD OF THE INVENTION

The invention is in the field of emergency power supply devices especially for emergency lighting, in particular emergency converter devices. The invention provides an interface for selecting an operation parameter for an emergency operation mode in the emergency converter device and a corresponding method.

BACKGROUND OF THE INVENTION

In emergency lighting systems, emergency converter devices, sometimes also referred as converters, ballasts or driver devices, are used for providing a supply current to an emergency lighting device for a predetermined time in case mains supply fails. The current supply is maintained in case of a mains supply failure for a rated service time using energy stored in an energy storage device such as a rechargeable battery. The rated service time defines a battery discharge duration during which time the emergency converter is required to drive the emergency light with a predetermined drive current. This predetermined drive current is a minimum load current enabling the lighting devices to fulfil their task of providing an emergency light level for the rated service time.

The rated service time or the minimum load current are usually selectable at the emergency converter device using a duration select switch, for example, setting the rated service time to either 1, 2 or 3 hrs.

This duration select switch is often implemented using a three-pin connector with a separate jumper link and pin header.

The functionality of the emergency light system has to be tested at predefined intervals by performing functional tests and has to be continuously monitored during operation using built-in test equipment.

A functional test is initiated, for example, by operating a test switch arranged at or externally to the emergency converter of the emergency light system. The test switch is often connected to the emergency lighting converter via a two-wire interface and wired to a control circuit, for example, a microcontroller controlling operations of the emergency lighting converter device.

A current operational state of the emergency lighting converter device is signalled using a status indicator light mounted such that it is visible from the outside of an emergency luminaire housing. The status indicator light usually comprises at least one light emitting diode (LED) to indicate plural different operational statuses of the emergency converter. Accordingly, at least two terminals (connections) for driving the status indicator light emitting diode based on a control signal from the microcontroller of the emergency converter are necessary.

Even if the test switch and the status indicator light would be mounted within the emergency converter device, the test switch interface and the status indicator light interface respectively use four terminals of the emergency lighting converter device and the duration select interface requires three dedicated and separate terminals, for example, implemented as pins, for selecting a predetermined rated service time out of two or three predefined rated service time values.

The discussed interface of the emergency lighting converter device comprises a duration select interface, a test switch interface, a status indicator light interface, not to mention an additional mains interface for power supply, a battery interface for emergency power supply, a light interface to lighting means.

In short, the interface of an emergency lighting converter device with a test switch, a status indicator light and a duration select interface for a rated service time require multiple signal lines on its printed circuit board and corresponding terminals at the interface of the emergency converter device. This interface involves considerable space at a housing assembly of the emergency converter device. The interface therefore causes considerable costs for the manufacturing the emergency converter device but also a significant space requirement in order to ensure that all interfaces are accessible.

SUMMARY OF THE INVENTION

The invention addresses the problem of designing an emergency converter device with small dimensions and to provide externally operable interfaces for setting operation parameters of the emergency converter device.

The emergency converter device according to claim 1 in a first aspect and the method for setting an operating parameter according to a second aspect provide an advantageous solution to this problem.

The dependent claims define further embodiments of the invention.

In the first aspect, an emergency lighting converter device for providing a supply current to a load device comprises a control circuit configured to set at least one operating parameter of the emergency converter device, an interface comprising a first terminal and a second terminal for connecting electrically a status indicator light emitting diode. The emergency converter device comprises a detection circuit connected to the control circuit. The detection circuit is configured to detect a polarity of the status indicator light emitting diode connected to the first terminal and the second terminal. The control circuit is configured to select the at least one operating parameter of the emergency converter device based on the detected polarity.

The emergency converter device is a now able, by determining the polarity with which the status indicator light emitting diode is connected to the first and second terminal of the status indicator light interface, to discriminate an actual orientation out of two possible orientations of the status indicator light emitting diode. Each of the two possible orientations of the diode is to be associated to one operation parameter value out of two possible operation parameter values. Thus, the detection circuit detects the actual polarity of the status indicator light emitting diode and providing the information on the control circuit of the emergency converter device. The control circuit uses the obtained information on the detected polarity to select and set the associated operation parameter value for operation of the emergency converter device. This means that a significant portion of the interface of the emergency converter device, the duration select interface, is no longer necessary, as its function is entirely integrated into another portion of the interface, the status indicator light interface. A whole connector, usually comprising three signal pins and the associated jumper switch can now be omitted.

The dimensions of the interface are therefore significantly reduced. Manufacturing cost will also decrease, as one large connector is dispensable. These connectors are even often manually mounted by electricians during manufacturing, so manufacturing cost will disproportionally decrease.

A separate jumper link and pin header for setting the operation parameter value and which tended to get lost over the lifespan of the emergency converter device, is no longer necessary, as its function is combined with the function of the status indicator light emitting diode.

The detection circuit of an advantageous embodiment is configured to determine whether a short circuit is applied between the first terminal and the second terminal.

If the detection circuit does only detect a polarity of the status indicator light emitting diode, but also whether a short circuit is applied between the first and second terminals of the status indicator light interface, the test switch can be also connected to the status indicator light interface in parallel. The actual test switch position, either open or closed, is now detectable for the detection circuit and can be communicated to the control circuit. The control circuit will, based on the obtained information, start a test routine when a short-circuit is detected. Thus, the emergency converter device can also dispense with a separate test switch interface, as the status indicator interface may now combine the functions of the status indicator interface with the functions of the test switch interface and the duration link select interface.

The advantages concerning small dimensions of the emergency converter device and advantageous manufacturing characteristics apply therefore to an even greater degree.

In a preferred embodiment of the emergency converter device, the at least one operating parameter a rated service time value or a minimum supply current value.

The inventive approach provides a versatile capability to set an operation parameter of the emergency converter device such as a rated service time. Emergency converter devices benefit from the improved interface significantly, as these converters require the duration select interface in order to cover with one product different regulatory requirements.

The interface of the emergency converter device of an advantageous embodiment further comprises an indicator configured to visually indicate an operating parameter value corresponding to the associated polarity of the status indicator light emitting diode connected to the first terminal and the second terminal.

A simple badge or tag attached close to the status indicator interface indicates to the user which of the possible two polarities for connecting the status indicator light emitting diode is associated with which value for the operation parameter. Thus, a person is enabled to easily learn how to connect the status indicator light emitting diode in order to set the operation parameter to the desired operation parameter value.

The detection circuit can be configured to generate a digital detection signal comprising information on the detected polarity of the status indicator light emitting diode.

The detection circuit therefore generates the digital signal, which can be directly provided to a digital input of the control circuit, for example, a microprocessor or ASIC, and used for setting the operation parameter value by the control circuit.

The digital signal (digital detection signal) in an embodiment comprises information whether a test switch of the emergency converter device is actuated.

The detection circuit therefore provides a single digital signal for communicating the information on the polarity and, if applicable, the test switch status (open or closed). This single digital signal combines the information previously provided from three different interfaces, the duration select interface, the test switch interface and the status indicator light interface. Accordingly, the number of interfaces at the control circuit decreases due to relying on a single digital signal for providing the information to the control circuit. The number of required terminals at the control circuit for obtaining this information also decreases. Reduced spatial requirements concerning conductor paths and number of terminals at the control circuit result in a simplified design of a printed circuit board of the emergency converter device.

The detection circuit of a preferred embodiment is configured to provide a status indicator light emitting diode current based on the detected polarity.

The detection circuit ensures thereby that the status indicator light emitting diode performs its function independently of the current polarity of the status indicator light emitting diode with respect to the first and second terminals.

The second aspect of the invention concerns a method for setting at least one operating parameter of an emergency converter device. The emergency converter device comprises a control circuit and an interface comprising a first terminal and a second terminal for connecting electrically a status indicator light emitting diode between the first terminal and the second terminal. The method comprises a step of detecting, by a detection circuit of the emergency converter device connected to the control circuit, a polarity of the status indicator light emitting diode connected to the first terminal and the second terminal. The method further comprises a subsequent step of setting, by the control circuit, the at least one operating parameter of the emergency converter device based on the detected polarity. The operating parameter that is associated with the determined polarity may be stored in a table in a memory of the emergency converter.

A preferred embodiment of the method for setting at least one operating parameter of an emergency converter device further comprises a step of determining, whether the emergency converter device is powered up or a reset operation is performed. The steps of detecting and setting are performed only in case the power up operation or the reset operation is determined in the step of determining whether a power up operation or a reset operation is performed.

Performing the determination of the power up operation or reset operation of the emergency converter device enables to ensure that status indicator light emitting diode operates thereafter correctly with the appropriate direction of the status indicator light current.

The method for setting at least one operating parameter of an emergency converter device may further comprise a step of detecting, by the detection circuit, whether a short circuit is applied between the first terminal and the second terminal. In case a short circuit is determined, the control circuit starts executing a test routine.

BRIEF DESCRIPTION OF THE DRAWINGS

The figures provide a discussion of embodiments of the invention in more detail.

DETAILED DESCRIPTION

In the figures, same reference numbers denote same or equivalent structures. The discussion of embodiments avoids repetitive explanation of structures with same reference numbers in different figures for sake of conciseness where considered possible without badly affecting clarity.

Figure 1:
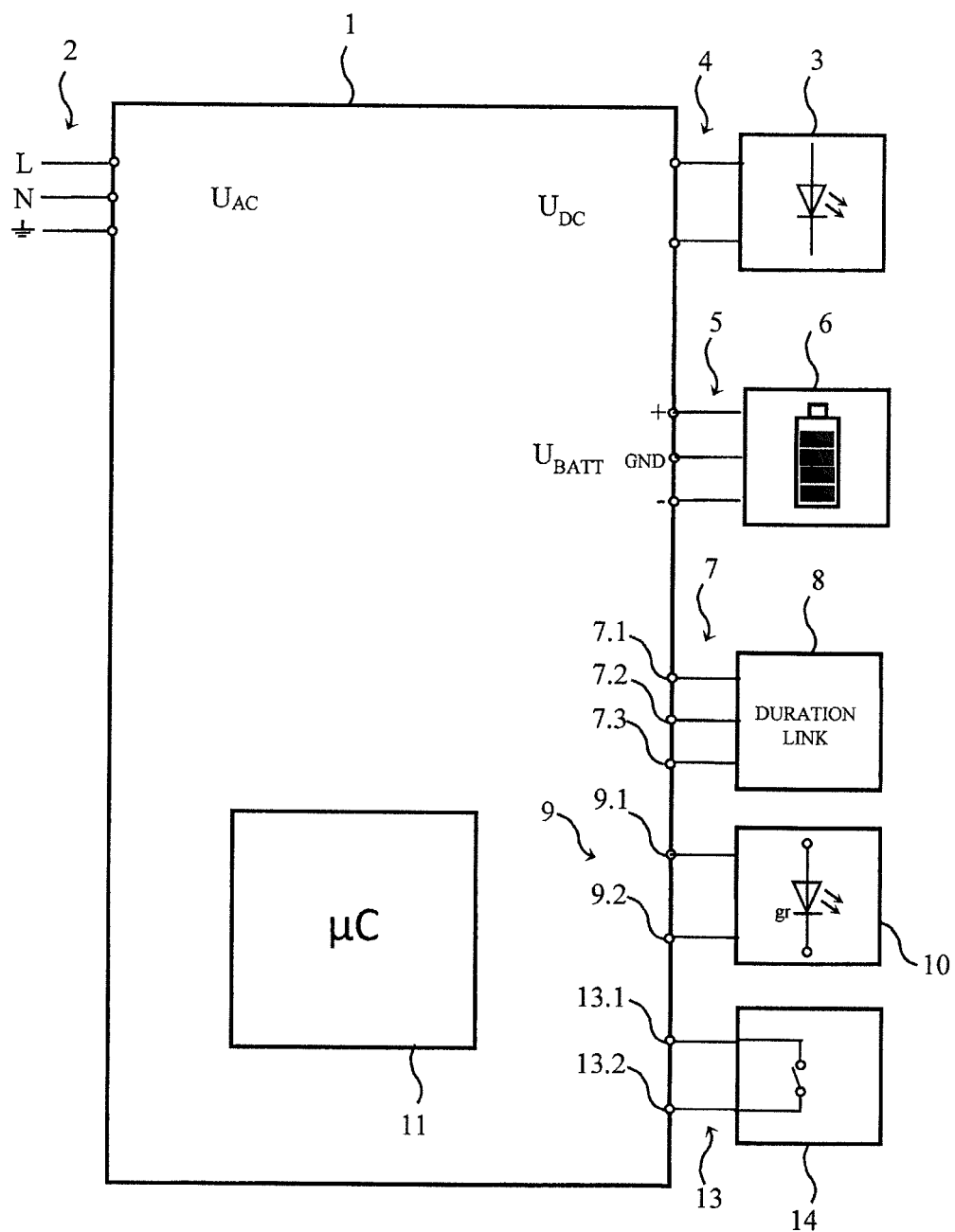
FIG. 1 depicts an overview over the external interfaces of an emergency lighting converter device, FIG. 2 a duration select circuitry in an emergency lighting converter device according to an embodiment, FIG. 3 an illustration of logic voltage levels of the digital signal generated by the detection circuit of the embodiment, FIG. 4 a schematic overview of the mechanical layout of the duration select assembly according to an embodiment, and FIG. 5 a simplified flowchart of a method for setting an operation parameter of the emergency converter device.

FIG. 1 provides a general overview of an emergency lighting converter device 1 as an example of an emergency converter device for lighting applications. The emergency lighting converter device 1 shows the typical interfaces to externally arranged devices and accessories such as a test switch 14 or a status indicator light emitting diode 10. FIG. 1 concentrates only on those elements and interfaces of the emergency lighting converter device 1, which support an understanding of the invention and its advantages.

A mains infrastructure of a building provides via a power supply interface 2 of the emergency lighting converter device 1 mains supply, for example, an alternating voltage $V_{AC}$ of 230 V/50 Hz, to the emergency lighting converter device 1.

The emergency lighting converter device 1 provides a load current $I_{LED}$ to a lighting module 3.

The emergency lighting converter device 1 provides a load voltage $U_{DC}$ to one or more lighting devices 3 (lighting modules) via a lighting interface 4. There may be further lighting interfaces 4 for connecting plural lighting devices 3 in parallel.

The lighting module 3 may comprise one or more light emitting diodes (LED) for providing light.

The lighting device 3 typically includes light emitting devices such as LED or gas discharge lamps, which are supplied with the load voltage $U_{DC}$ or the load current $I_{LED}$ via the lighting interface 4. The lighting device 3 may include one or more light emitting devices exclusively dedicated for operating during an emergency operation mode.

While the previously described elements are characteristic for any converter or ballast for lighting applications, too, the emergency lighting converter device 1 also comprises a battery interface 5 for connecting a rechargeable battery 6 as an energy storage device storing electric energy. The rechargeable battery 6 is charged with a charge current $I_{CHARGE}$ via the battery interface 5 during a standard operation mode of the emergency lighting converter device 1. The emergency lighting converter device 1 operates in the standard operation mode from electric energy drawn from mains supply via the mains supply interface 2.

In the emergency operation mode, for example, in case of a mains supply failure, the emergency lighting converter device 1 provides the lighting device 3 with electric energy drawn from the rechargeable battery 6. In particular, the emergency lighting converter device 1 provides during the emergency operation mode the load current $I_{LED}$ with a predefined current value for a predefined minimum time, the battery discharge duration time or rated service time, to the lighting device 3.

The battery discharge duration time may for example be selectable and be either 1 hr or 3 hrs as explained above.

A duration link select interface 7 of the emergency converter 1 enables a user to preselect the battery discharge duration time. The duration link select interface 7 may comprise two or more parallel signal lines for connecting one or more select switches (battery duration select switches) 8.

The duration link select interface 7 and the select switches 8 may be implemented by a duration link selector including three pins 7.1, 7.2, 7.3 arranged in series, the central pin 7.2 being a ground pin connected with electric ground potential (device ground). A jumper or duration link, including a simple short circuit, may be positioned in either of two different locations on the three pins 7.1, 7.2, 7.3 in each of the positions providing a short circuit of one of the remaining two pins 7.1, 7.3 to the central ground pin 7.2.

For example the duration link select switch 8 may be arranged on a main printed circuit board of the emergency lighting converter device 1 and be accessible via an opening through a housing assembly (enclosure) of the emergency lighting converter device 1.

The duration link select interface 7 connects via signal lines (conducting paths or conductor tracks) on the printed circuit board to the control circuit 11 of the emergency lighting converter device 1. The control circuit 11 may contain one or more microcontroller circuits or application specific integrated circuits (ASICs). The control circuit 11 controls operation of the emergency lighting converter device 1. The control circuit 11 can execute and control functions and program routines, for example, for the change of operational modes such as the standard mode of operation (standard operation mode), the emergency operation mode, a charging operation mode for charging the battery 6, or monitoring of a load at the lighting interface 3. The control circuit 11 may perform test and monitoring functions for the emergency lighting converter device 1 and its interfaces and control a battery charging circuit that is not shown in FIG. 1.

The control circuit 11 may function as a data logger or data recorder by recording data over time or in relation to a location of the emergency lighting converter device 1, for example, from a built in instrument or sensor or on operational statuses, failures, etc.

The control circuit 11 may, for example, run internal test routines, in particular start running a test routine when a test switch 14 is actuated. The test switch 14 may be arranged internally or, preferably external to the housing assembly of the emergency lighting converter device 1.

Additionally or alternatively, service intervals may be selected by operating the test switch 14.

The test switch 14 can be implemented in different forms, for example, as a rocker switch, a toggle switch or preferably as a push button. The test switch 14 may be arranged in a casing of a luminaire to be externally accessible and operable by a person, wherein the emergency lighting converter device 1 is positioned within the casing assembly of the luminaire. The test switch 14 may be wired to the test switch interface 13 using two connecting wires. Typically, one of the terminals (connecting elements), for example the first terminal 13.1 of the test switch interface 13 is connected internally with a low voltage power supply of the emergency lighting converter device 1. The test switch 14 is configured to short-circuit the first terminal 13.1 and the second terminal 13.2 when the test switch 11 is actuated.

A status indicator light, depicted as a first status indicator light emitting diode 10, is connected via the status indicator light interface 9. The status indicator light 10 connects via an interface of the emergency lighting converter device 1 with a first terminal 9.1 and a second terminal 9.2 to the emergency lighting converter device 1.

The status indicator light 10 is controlled to emit light in a targeted manner Thus, an operational state of the emergency lighting converter device 1 may be visually signalled using the status indicator light 10.

The control circuit 11 may control the status indicator light 10 in different light emitting modes such as "light on", "light off", "slow flashing", "rapid flashing" for signalling the different operation modes, operational states or results of test procedures of the emergency lighting converter device 1. Some of the different operation modes, operational states or results of test procedures may signal information such as "system ok", "functional test is ongoing", "battery backed endurance test is running", "load failure", "battery failure", "battery charging failure", or "in emergency operation mode".

The status indicator light emitting diode 10 is driven by a status indicator drive signal, which can be a pulse width modulated signal (PWM signal).

Preferably, the status indicator light 10 is integrated into on a single structural module as status indicator light 10 as indicated in FIG. 1. A single structural module comprising the status indicator light 10 and even the test switch 14 may be arranged at a suitable position of an emergency luminaire including the emergency lighting converter device 1. Thus, control elements such as a test switch 14 of the emergency lighting converter device 1 as well as the status indicator light 10 are easy to operate and the status indicator light 10 is equally easy to read for a user.

Figure 2:
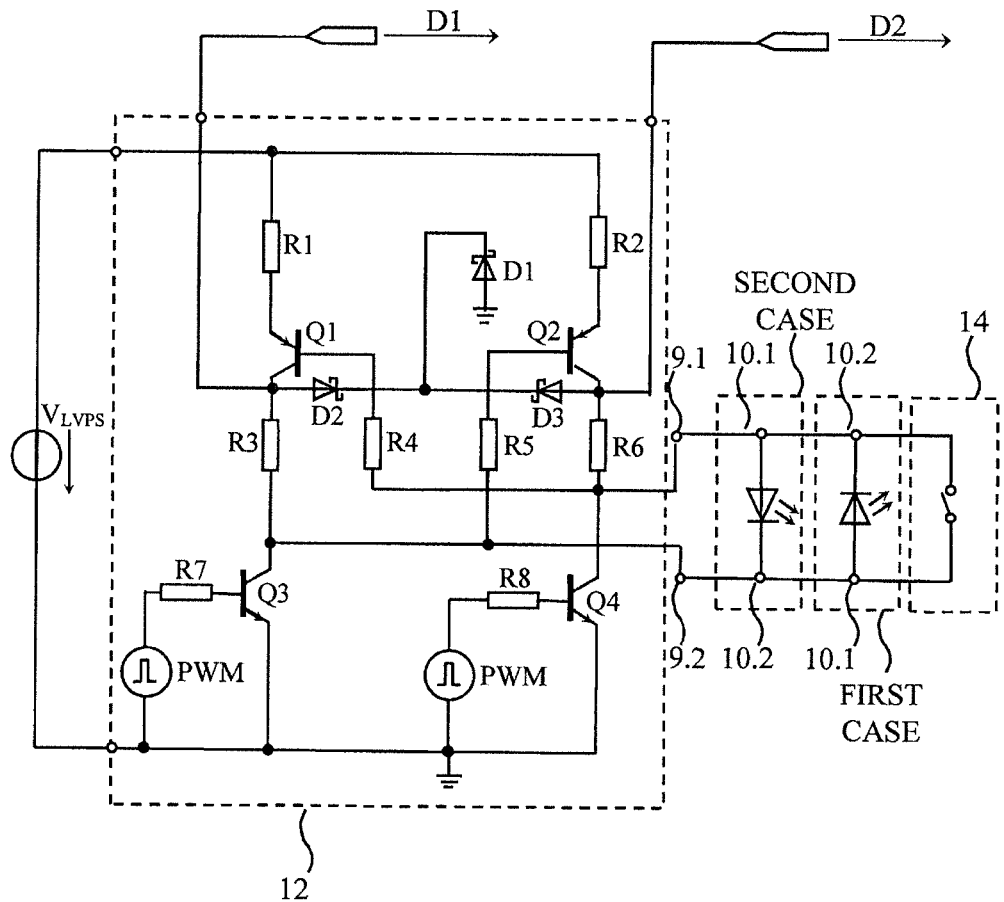
Figure 2:
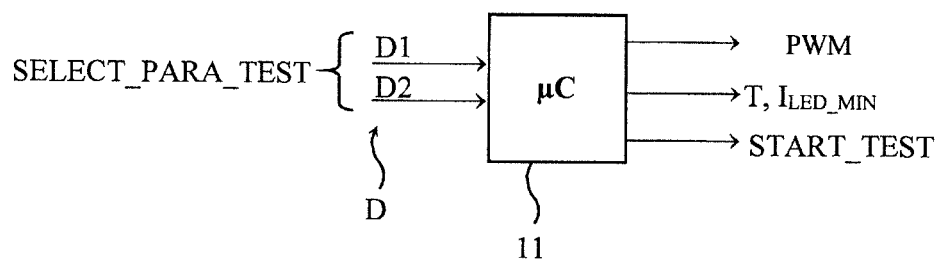

FIG. 2 shows an embodiment of a detection circuit 12 in an emergency lighting converter device 1.

The detection circuit 12 operates from a low voltage power supply providing a DC voltage $V_{LVPS}$. $V_{LVPS}$ may be provided by a secondary circuit of a flyback converter.

The detection circuit 12 is connected to the first terminal 9.1 and the second terminal 9.2 of the duration select/test switch interface 9. The first terminal 9.1 and the second terminal 9.2 of the duration select/test switch interface 9 each represent an input terminal of the detection circuit 12.

FIG. 2 shows the status indicator light emitting diode 10 connected in two different polarizations between the terminals 9.1 and 9.2 in a single figure. It is to be noted that the status indicator light emitting diode 10 is either connected with its anode terminal 10.1 to the terminal 9.2 and its cathode terminal 10.2 to the terminal 9.1 in a first case, or the status indicator light emitting diode 10 is either connected with its anode terminal 10.1 to the terminal 9.1 and its cathode terminal 10.2 to the terminal 9.2 in a second case 2.

Both cases, first case and second case, which occur as alternatives only, are depicted in FIG. 2 simultaneously.

The detection circuit 12 generates a digital output signal SELECT_PARA_TEST that is transmitted to the control circuit 11. The digital output signal SELECT_PARA_TEST provided by the detection circuit 12 depicted in FIG. 2 is a parallel digital signal on two signal lines, D1 and D2.

The detection circuit 12 is configured to determine whether an anode terminal 10.1 of the status indicator light emitting diode 10 is connected with the first terminal 9.1 or the second terminal 9.2, and whether a cathode terminal 10.2 of the status indicator light emitting diode 10 is connected with the second terminal 9.2 or the first second terminal 9.1.

In the first case, the status indicator light emitting diode 10 is connected with its anode terminal 10.1 to the terminal 9.2 and its cathode terminal 10.2 to the terminal 9.1.

The test switch 14 is in an open state in the first case.

In the first case, a first transistor Q1 and a fourth transistor are switched to conduct via the emitter-collector path. The signal line of a first parameter select signal D1 to the control circuit 11 is on a logic high signal level. The signal line of a second parameter select signal D2 to the control circuit 11 is on a logic low signal level.

The status indicator light emitting diode 10 emits light based on the PWM signal applied to the base of the fourth transistor Q4.

In the second case, the status indicator light emitting diode 10 is connected with its anode terminal 10.1 to the terminal 9.1 and its cathode terminal 10.2 to the terminal 9.2.

The test switch 14 is in an open state in the second case.

In the second case, a second transistor Q2 and a third transistor Q3 are switched to conduct via the emitter-collector path. The signal line of a first parameter select signal D1 to the control circuit 11 is on a logic low signal level. The signal line of a second parameter select signal D2 to the control circuit 11 is on a logic high signal level.

The status indicator light emitting diode 10 emits light based on the PWM signal applied to the base of the third transistor Q3.

The detection circuit 12 accordingly generates a parallel digital signal D on two signal lines that comprises information on the polarity of the status indicator light emitting diode 10 with respect to the first terminal 9.1 and the second terminal 9.2 of the status indicator light interface 9.

In a third case, the test switch 14 is actuated. A short circuit is applied between the first terminal 9.1 and the second terminal 9.2 of the status indicator light interface 9.

In the third case, either the second transistor Q2 and the third transistor Q3 are switched on to conduct via their emitter-collector path, or the first transistor Q1 and the fourth transistor Q4 are switched conducting via the emitter-collector path.

The signal line of the first parameter select signal D1 to the control circuit 11 is on a logic low signal level. The signal line of the second parameter select signal D2 to the control circuit 11 is on a logic low signal level.

Thus, the detection circuit 12 accordingly generates a parallel digital signal D on two signal lines that comprises information on a switch state of the test switch 14 in addition to the polarity of the status indicator light emitting diode 10 with respect to the first terminal 9.1 and the second terminal 9.2 of the status indicator light interface 9.

The control circuit 11 generates and outputs a PWM signal for driving the status indicator light emitting diode 10. The PWM signal is provided to a base of the third transistor Q3 and of the fourth transistor Q4. The third transistor Q3 and the fourth transistor Q4 ensure that a voltage drop over the status indicator light emitting diode 10 is generated independent from the actual polarity of the status indicator light emitting diode 10 with respect to the first terminal 9.1 and the second terminal 9.2.

The control circuit 11 may generate and output a signal START_TEST for initiating the start of a test routine based on the obtained digital signal D. The signal START_TEST may also be an internal signal of the control circuit 11.

Figure 3:
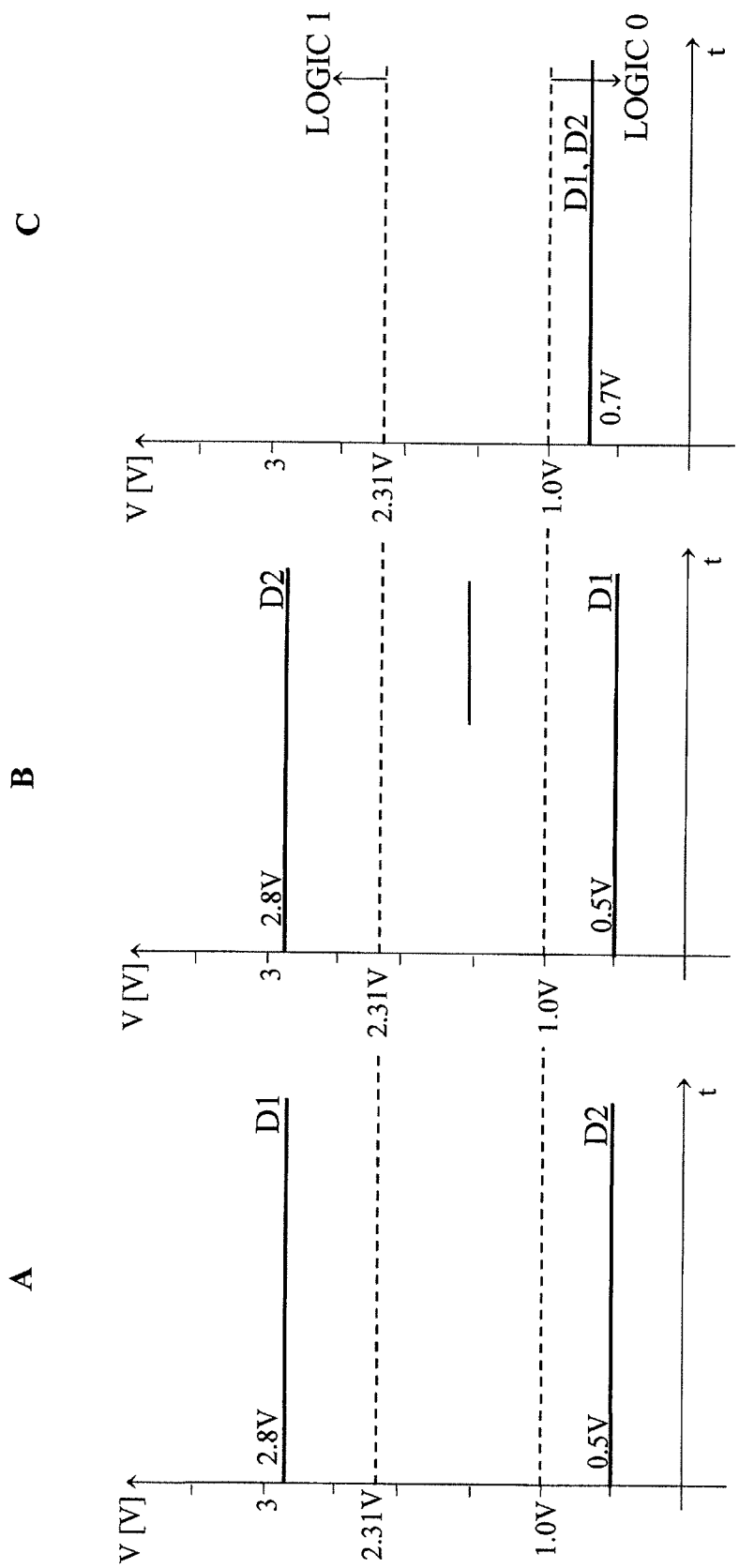

FIG. 3 depicts logic voltage levels occurring in the embodiment. FIG. 3 illustrates three different cases in which specific settings of the test switch 14 and a specific orientation of the status indicator light emitting diode 10 generates distinct parameter select signals D1, D2. The respectively parameter select signals D1, D2 enable the control circuit 11 to determine the operation parameter based on the combination of logic levels of the parameter select signals D1, D2.

The left portion A of FIG. 3 shows the first case. In the first case, the status indicator light emitting diode 10 is positioned in the first orientation with respect to the status indicator light interface 9.

In the first case, the test switch 14 is in an open (non-conducting) state.

The first transistor Q1 and the fourth transistor Q4 are switched on in the first case.

The first parameter select signal D1 has a voltage level of about 2.8 V in the specific duration select circuit of FIG. 2. The first parameter select signal D1 accordingly exceeds a lower voltage threshold of 2.31 V for a logic 1 level. The second parameter select signal D2 has a voltage level of about 0.5 V for the specific duration select circuit of FIG. 2. The second parameter select signal D2 accordingly is below an upper voltage threshold of 1 V for a logic 0 level.

The control circuit 11 may interpret the first case, in which the first parameter select signal D1 is logic 1 and the second parameter select signal D2 is logic 0 such that the parameter is to be set to a first value. The parameter may be a rated time duration for the emergency operation mode. The parameter may be a rated time duration for the emergency operation mode may be set to first parameter value. The first parameter value may be a duration time of 1 hour, for example.

The centre portion B of FIG. 3 shows the second case. In the second case, the status indicator light emitting diode 10 is positioned in the second orientation with respect to the status indicator light interface 9.

In the second case, the test switch 14 is in an open (non-conducting) state.

The second transistor Q2 and the third transistor Q3 are switched on.

The first parameter select signal D1 has a voltage level of about 0.5 V in the specific duration select circuit of FIG. 2. The first parameter select signal D1 accordingly is below the upper voltage threshold of 1 V for a logic 0 level. The second parameter select signal D2 has a voltage level of about 2.8 V for the specific duration select circuit of FIG. 2. The second parameter select signal D2 accordingly exceeds an upper voltage threshold of 2.31 V for a logic 1 level.

The control circuit 11 may interpret the second case, in which the first parameter select signal D1 is logic 0 and the second parameter select signal D2 is logic 1 such that the parameter is to be set to a second value. The parameter may be the rated time duration for the emergency operation mode. The parameter may be the rated time duration for the emergency operation mode and may be set to a second parameter value. The second parameter value may be a duration time of 3 hrs, for example.

The right portion C of FIG. 3 shows the third case. In the third case, the status indicator light emitting diode 10 may be positioned either in the first orientation with respect to the status indicator light interface 9 or in the second orientation with respect to the status indicator light interface 9.

In the third case, the test switch 14 is in the closed (conducting) state. In the closed state of the test switch 14, a short circuit is applied between the first terminal 9.1 and the second terminal 9.2 of the status indicator light interface 9.

In the third case, either the first transistor Q1 and the fourth transistor Q4, or the second transistor Q2 and the third transistor Q3 are on. Thus, both the first parameter select signal D1 and the second parameter select signal D2 have a voltage level of about 0.7 V in the specific duration select circuit of FIG. 2. The first parameter select signal D1 and the second parameter select signal D2 are below the lower voltage threshold of 1V for a logic 0 level.

The control circuit 11 may interpret the third case, in which both the first parameter select signal D1 and the second parameter select signal D2 is logic 0 such that the parameter setting is not to be changed, but a specific operation procedure is initiated. The operation procedure may be, for example setting the emergency lighting converter device 1 into a specific operation mode and/or starting to run a test procedure.

The logic levels for the three cases in FIG. 3 and in particular in combination with the exemplary duration select circuit in FIG. 2, shows that by connecting a status indicator light emitting diode in different orientation with respect to the first terminal 9.1 and the second terminal 9.2 of the status indicator light interface 9, selecting the first parameter value or selecting the second parameter value can be communicated to the control circuit 11.

Figure 4:
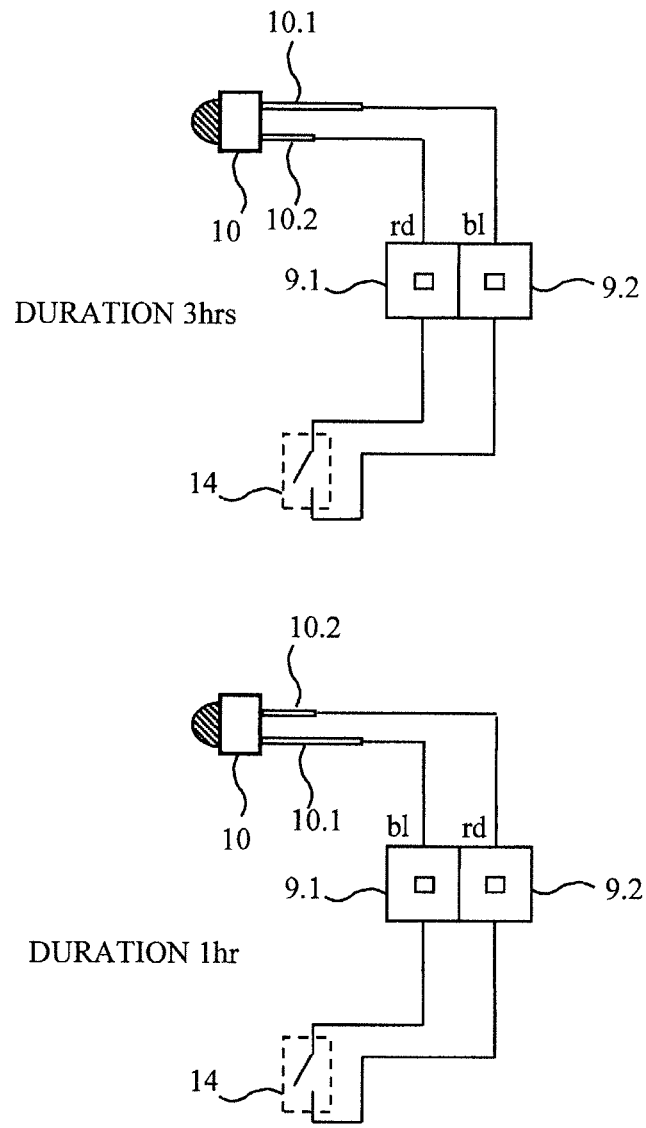

FIG. 4 provides a schematic overview of a mechanical layout of a duration select assembly according to an embodiment.

The status indicator light emitting diode 10 comprises a first (anode) terminal 10.1 with a first connecting wire (black—bl) and a second (cathode) terminal 10.2 with a second connecting wire (red—rd).

In the upper portion of FIG. 4, the first terminal 10.1 with the first connecting wire (black—bl) is connected with the second terminal 9.2 of the status indicator light interface 9. The second terminal 10.2 is connected with the second connecting wire (red—rd) with the first terminal 9.1 of the status indicator light interface 9.

The detection circuit 12 detects the polarity of the status indicator light emitting diode 10 and provides this information to the control circuit 11. The control circuit 11 associates the received detection information with a duration (rated service time) of 3 hrs.

The status indicator light interface 9 may include a visual indicator, for example, a label, which presents this associated information of a duration of 3 hrs together with connecting the first connecting wire (black—bl) with the second terminal 9.2 of the status indicator light interface 9 and connecting the second connecting wire (red—rd) with the first terminal 9.1 of the status indicator light interface 9.

The visual indicator further comprises the associated information of a duration of 1 hr together with connecting the first connecting wire (black—bl) with the first terminal 9.1 of the status indicator light interface 9 and connecting the second connecting wire (red—rd) with the second terminal 9.2 of the status indicator light interface 9. This case corresponds to the lower portion of FIG. 4.

In the lower portion of FIG. 4, the first terminal 10.1 with the first connecting wire (black—bl) is connected with the first terminal 9.1 of the status indicator light interface 9. The second terminal 10.2 is connected with the second connecting wire (red—rd) with the second terminal 9.2 of the status indicator light interface 9. Given this case, the detection circuit 12 detects the polarity of the status indicator light emitting diode 10 and provides this information to the control circuit 11. The control circuit 11 associates the received detection information with a duration (rated service time) of 1 hr.

FIG. 4 also shows the test switch 14 connected in parallel to the status indicator light emitting diode 10.

Figure 5:
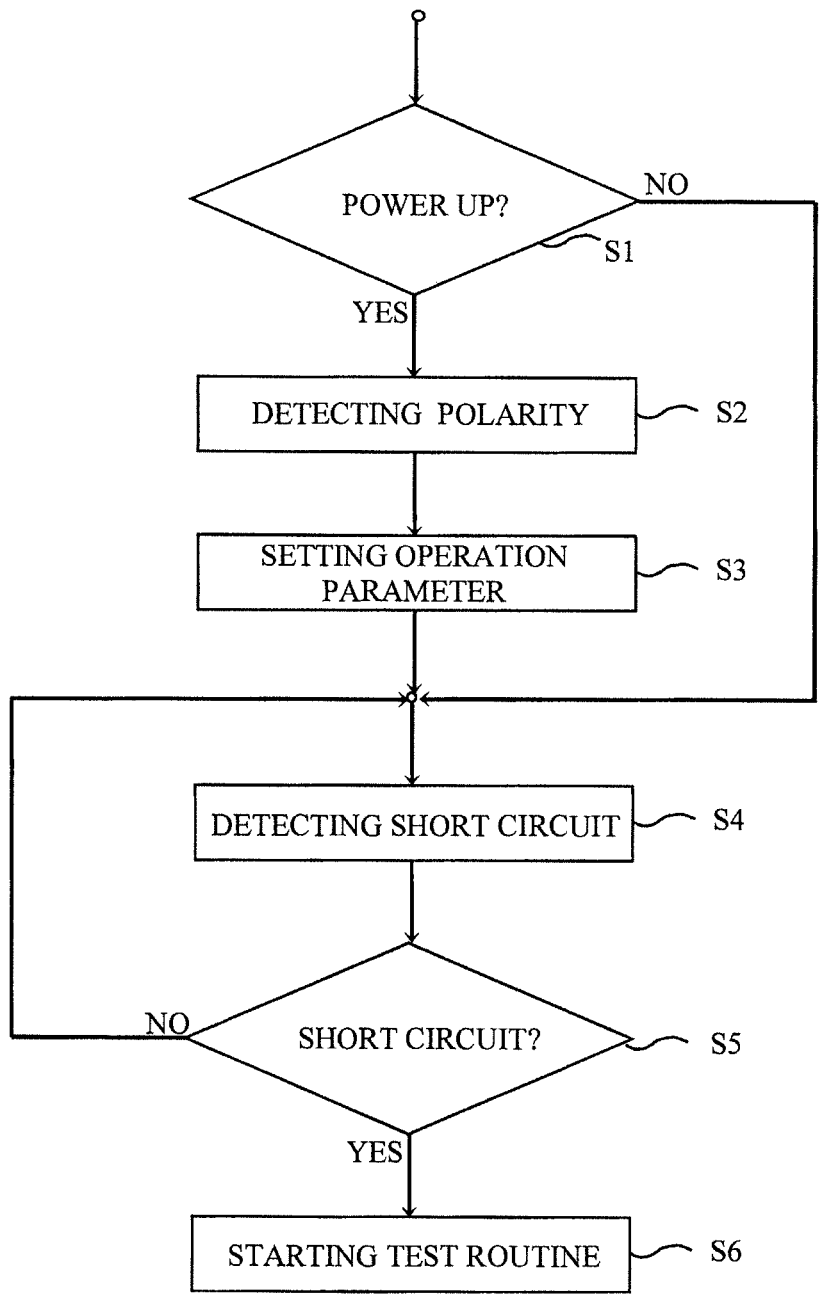

FIG. 5 provides a simplified flowchart of a method for setting an operation parameter of the emergency converter device 1.

The method starts with a step S1 of determining, whether the emergency converter device 1 is powered up, or alternatively, whether a reset operation is performed. If in step S1 the power up operation or the reset operation is determined to occur, the method proceeds to a step S2.

In step S2, the detection circuit 12 of the emergency converter device 1 connected to the control circuit, detects a polarity of the status indicator light emitting diode 10 connected to the first terminal 9.1 and the second terminal 9.2.

In a step S3 succeeding to step S2, the control circuit 11 sets the at least one operating parameter of the emergency converter device 1 based on the detected polarity, which is provided by the detection circuit 12. The method then proceeds to step S4.

In case in step S1 neither a power up operation nor a reset operation is detected, the method skips the steps S2 and S3 and proceeds from step S1 directly to step S4. In this case, the steps S2 and S3 are skipped.

In step S4, the detection circuit 12 detects, whether a short circuit is applied between the first terminal 9.1 and the second terminal 9.2. In case the control circuit 11 determines in step S5 succeeding to step S4, that the detection circuit 12 detected a short circuit in step S4, the control circuit 11 proceeds to step S6.

In case the control circuit 11 determines in step S5 that the detecting circuit 12 did not detect a short circuit between the first terminal 9.1 and the second terminal 9.2, the method returns to step S4.

In step S6, the control circuit 11 starts executing the test routine as the detection circuit 12 provided information on an actuation of the test switch 14 in the digital detection signal D.

The flowchart illustrates that by implementing the invention, setting an operating parameter based on a simple input using the polarity of a status indicator light emitting diode 10 and even detection of the state of the test switch 14 is possible, while simultaneously reducing the complexity of the interface of the emergency lighting converter significantly.

What is claimed is:

1. An emergency converter device for providing a supply current ($I_{LED}$) to a load device, the emergency converter device comprising:
   a control circuit (11) configured to set at least one operating parameter of the emergency converter device;
   an interface (9) comprising a first terminal (9.1) and a second terminal (9.2) for electrically connecting a status indicator light emitting diode (10); and
   a detection circuit (12) connected to the control circuit (11), the detection circuit (12) configured to detected a polarity of the status indicator light emitting diode (10) connected to the first terminal (9.1) and the second terminal (9.2); wherein
   the control circuit (11) is configured to set the at least one operating parameter of the emergency converter device based on the detected polarity.

2. The emergency converter device according to claim 1, characterized in that
   the detection circuit (12) is further configured to determine whether a short circuit is applied between the first terminal (9.1) and the second terminal (9.2).

3. The emergency converter device according to claim 1, characterized in that
   the at least one operating parameter is a rated service time value or a minimum supply current value ($I_{LED\_MIN}$).

4. The emergency converter device according to claim 1, characterized in that
   the interface (9) further comprises an indicator configured to visually indicate an operating parameter value corresponding to the polarity of the status indicator light emitting diode (10) connected to the first terminal (9.1) and the second terminal (9.2).

5. The emergency converter device according to claim 1, characterized in that
   the detection circuit (12) is configured to generate a digital detection signal (D) comprising information on the detected polarity of the status indicator light emitting diode (10).

6. The emergency converter device according to claim 1, characterized in that
   the digital detection signal (D) comprises information whether a test switch (14) is actuated.

7. The emergency converter device according to claim 1, characterized in that
   the detection circuit (12) is configured to provide a status indicator light emitting diode current ($I_{STATUS}$) based on the detected polarity.

8. A method for setting at least one operating parameter of an emergency converter device (1),
   the emergency converter device comprising a control circuit (11) and an interface (9) comprising a first terminal (9.1) and a second terminal (9.2) for electrically connecting a status indicator light emitting diode (10), and
   characterized in comprising steps of
   detecting (S2), by a detection circuit (12) connected to the control circuit (11), a polarity of the status indicator light emitting diode (10) connected to the first terminal (9.1) and the second terminal (9.2), and
   setting (S3), by the control circuit (11), the at least one operating parameter of the emergency converter device (1) based on the detected polarity.

9. The method for setting at least one operating parameter of an emergency converter device (1) according to claim 8, characterized in further comprising a step of
   determining (S1), whether the emergency converter device (1) is powered up or a reset operation is performed, and
   performing the steps of detecting (S2) and setting (S3) only in case the power up operation or the reset operation is determined.

10. The method for setting at least one operating parameter of an emergency converter device (1) according to claim 8,
    characterized in further comprising a step of
    detecting (S4), by the detection circuit (12), whether a short circuit is applied between the first terminal (9.1) and the second terminal (9.2), and
    starting (S5), by the control circuit (11), executing a test routine in case the short circuit is detected.

* * * * *